United States Patent [19]

Yaguchi et al.

[11] 4,192,581
[45] Mar. 11, 1980

[54] ELECTROCHROMIC DISPLAY DEVICE

[75] Inventors: Masachika Yaguchi, Yokohama; Haruhiro Kato, Kawasaki, both of Japan

[73] Assignee: Dai Nippon Toryo Co, Ltd., Osaka, Japan

[21] Appl. No.: 769,564

[22] Filed: Feb. 17, 1977

[30] Foreign Application Priority Data

Feb. 20, 1976 [JP] Japan .................... 51-17509

[51] Int. Cl.² .................... G02F 1/17; G02F 1/23
[52] U.S. Cl. .................... 350/357; 252/408
[58] Field of Search .................... 252/408; 350/357

[56] References Cited

U.S. PATENT DOCUMENTS

| | | | |
|---|---|---|---|
| 3,451,741 | 6/1969 | Manos | 350/357 |
| 3,652,149 | 3/1972 | Rogers | 350/357 |
| 3,712,709 | 1/1973 | Kenworthy | 350/357 |
| 3,806,229 | 4/1974 | Schoot et al. | 252/408 |
| 3,854,794 | 12/1974 | Van Dam et al. | 350/357 |
| 3,912,368 | 10/1975 | Ponjee et al. | 350/357 |
| 4,006,969 | 2/1977 | Kouchi et al. | 350/357 |
| 4,006,969 | 2/1977 | Kouchi et al. | 350/357 |
| 4,008,950 | 2/1977 | Chapman et al. | 350/357 |
| 4,036,551 | 7/1977 | Mori | 350/357 |
| 4,116,535 | 9/1978 | Ponjee et al. | 252/408 |

FOREIGN PATENT DOCUMENTS

51-107149 9/1976 Japan .................... 350/357
51-107150 9/1976 Japan .................... 350/357

OTHER PUBLICATIONS

Kawata, T. et al., Japan. J. Appl. Pays., vol. 14, No. 5, pp. 725-726 (1975).

*Primary Examiner*—Teddy S. Gron
*Attorney, Agent, or Firm*—Gerald J. Ferguson, Jr.; Joseph J. Baker

[57] ABSTRACT

An electrochromic display device composed of a pair of oppositely disposed electrode plates at one of which is transparent, and an electrochromic composition sealed between the pair of electrode plates. The electrochromic composition is composed of an electrochromic compound coloring in a reduced state and a solvent. The electrochromic compound coloring in a reduced state is sealed between the electrode plated in a reducing atmosphere. The solubility of the electrochromic compound to the solvent is $10^{-2}$ mol/(100 g solvent) or more in a reduced state and $10^{-1}$ mol/(100 g solvent) or more in an oxidized state. The solvent is preferably composed of water and at least 70% by weight of alcohol. The alcohol is desirably polyhydric alcohol.

24 Claims, 8 Drawing Figures

ELECTROCHROMIC DISPLAY DEVICE

BACKGROUND OF THE INVENTION

1. Field of the Invention

This invention relates to an electrochromic display device for displaying information on a transparent plate, and more particularly to an electrochromic display device composed of a pair of oppositely disposed electrode plates and an electrochromic composition coloring in a reduced state sealed between the pair of electrode plates. 2. Description of the Prior Art It is known that electrochromic materials present different colors depending upon the state of the materials, i.e. oxidized state or reduced state, since the spectroscopic absorption of the materials differs depending upon the state thereof. As the electrochromic materials are known inorganic electromic compounds such as tugsten oxide and molybdenum oxide, and organic electrochromic compounds such as pyridin compounds and aminoquinon compounds. The electromic compounds are divided into electrochromic compounds coloring in a reduced state and those coloring in an oxidized state. The electrochromic compounds coloring in a reduced state does not show a color or shows a light color in an oxidized state and colors in a reduced state. The electrochromic compounds coloring in an oxidized state does not show a color in a reduced state and colors in an oxidized state.

The electrochromic compounds are therefore sealed between a pair of electrodes at least one of which is transparent and subjected to an electric field applied thereacross. When the electric field application is turned on and off across the space between the pair of electrodes, the color of the electrochromic compound sealed therein changes. Therefore, by making the electrodes into a patterned form, a pattern display can be effected. Actually, patterned transparent electrodes are applied on the inner surface of a pair of electrode support plates.

In the conventional electrochromic display device, the electrochromic compound is sealed in the space between the pair of electrodes in an oxidized state. When the pair of electrodes are supplied with a voltage, the electrochromic compound in the vicinity of the cathode side electrode is colored. Therefore, the display is conducted in the form of the pattern of the cathode side electrode.

The above described electrochromic display device (hereinbelow referred to simply as "EC display") has a defect as follows. In a sealed system wherein the electrochromic compound (hereinbelow referred to simply as "EC compound") is isolated from the ambient atmosphere, a part of the EC compound becomes non-reversible by the influence of a hydrogen gas or the like generated by the electrolytic effect of water added to the EC compound as a solvent. Therefore, a part of the EC composition sealed in the EC display remains to be reduced even after the application of electric field is turned off. Further, since the EC compound has a little solubility in the reduced state, the colored EC compound in the reduced state gradually diffuses on the display face of the EC display, which results in degradation in the quality of image displayed.

Since the EC compound conducts the display by the reversible change in color between the oxidized and reduced states, the display once made will not disappear until the reduced EC compound diffuses through the solvent as water in the EC compound. Therefore, the conventional EC display is normally of so-called memory type which maintains the displayed pattern for a long time. In practice, there is known a memory type EC display which is capable of maintaining its displayed pattern for several months.

The memory type EC display as described above is suitable for a display device which is designed to maintain the displayed pattern for a long time. However, this type of EC display is not proper to a display device in which the displayed pattern is required to frequently change as in the dial of clocks or watches. In those cases where the displayed pattern should be frequently changed, the displayed pattern by application of an electric field in one direction is erased by application of an electric field in the opposite direction as shown in U.S. Pat. No. 3,774,988.

The above described memory type EC display which needs an electric circuit for reversing the direction of application of the electric field is disadvantageous in that the circuit structure gets complicated.

On the other hand, it has been known in the art to show and erase a displayed pattern only by turning on and off the power supply to the EC display as in U.S. Pat. No. 3,774,988. In this EC display device, an EC compound of oxidation state is sealed in a cell with a small opening. The EC compound is reduced when it is subjected to an electric field and the reduced compound is returned to its oxidation state by contact with air by way of said opening when the electric field is turned off.

The above described EC display in which the reduced EC compound is returned to its oxidation state to erase the displayed pattern only by turning off the electric field is disadvantageous in that the area of the displayed pattern cannot be made so large since the oxidation is conducted through the contact of the EC compound with the oxygen in air by way of the small opening provided in the display device. Further, since water is used as the solvent, the water will be vaporized through the opening and accordingly the life of the display is not so long.

SUMMARY OF THE INVENTION

In view of the above defects inherent in the conventional EC display, the primary object of the present invention is to provide an electrochromic display device in which the display is presented and erased only by turning on and off a D.C. power source.

Another object of the present invention is to provide an electrochromic display which has a long life in its operation of a stable display.

Still another object of the present invention is to provide an electrochromic display device capable of conducting display throughout a large range of temperature.

A further object of the present invention is to provide an electrochromic display device capable of using various kinds of electrochromic compounds over a wide range of kinds of EC compounds.

A still further object of the present invention is to provide an electrochromic display device capable of displaying a pattern with clear edges to effect a clear display of various information.

A still further object of the present invention is to provide an electrochromic display device capable of displaying a pattern of uniform density and high contrast.

A still further object of the present invention is to provide an electrochromic display device capable of displaying a pattern with a small electric power.

The above objects are accomplished by sealing an electrochromic composition coloring in a reduced state in a space between a pair of electrode plates at least one of which is transparent. The electrochromic composition coloring in a reduced state is composed of an electrochromic compound and a solvent, wherein the solubility of the compound to the solvent is not less than $10^{-2}$ mol/(100 g solvent) in a reduced state and not less than $10^{-1}$ mol/(100 g solvent) in an oxidized state. The electrochromic compound is sealed in the space in a reduced state.

Other features of the present invention which accomplish some of the above enumerated objects will be described in detail in the following description of the preferred embodiments of the invention taken in conjunction with the accompanying drawings.

In accordance with the present invention, the conventional problem of degradation in quality of image displayed is solved since the EC compound is sealed in a reduced state and the display is conducted by the conversion of the EC compound from the reduced state to the oxidized state. Further, since the solubility of the EC compound is not less than a predetermined level, the displayed pattern is quickly erased by turning off the power source. Therefore, it is not necessary to apply an electric field in the opposite direction to erase the display. The provision of an opening is also not necessary to restore the original state of the EC compound.

In operation of the EC display in accordance with the present invention (hereinbelow referred to as "diffusion type electrochromic display"), the EC compound coloring in a reduced state is sealed in a cell in a reduced state. Therefore, the diffusion type EC display presents a colored pattern when no electric field is applied thereto. When an electric field is applied, the EC compound changes its color to achromatic transparent condition, whereby a white color of emulsion or a color of pigments appears upon application of the electric field. This change appears on the anode side electrode. The anode is formed in a pattern to be displayed so that the change in color from the color of the EC compound in a reduced state to the color of the pigment or emulsion is displayed in the pattern form. Upon turning off of the electric field, the oxidized EC compound immediately diffuses into the solvent and accordingly the displayed pattern quickly disappears.

DESCRIPTION OF THE PREFERRED EMBODIMENTS

Figure 1:
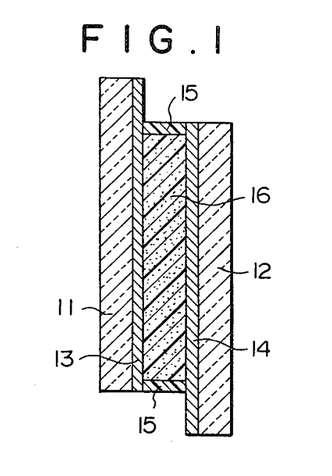
FIG. 1 is a cross sectional view of an electrochromic display device in accordance with an embodiment of the present invention.

Referring to FIG. 1, a pair of electrode plates 11 and 12 are oppositely disposed and are provided on the inner surface thereof with electrode layers 13 and 14. Between the pair of oppositely disposed electrode plates 11 and 12 is provided a spacer 15 to form an enclosed space between the electrode plates 11 and 12. The space enclosed with the spacer 15 and the electrode layers 13 and 14 on the electrode plates 11 and 12 is filled with an electrochromic composition 16.

Figure 2A:
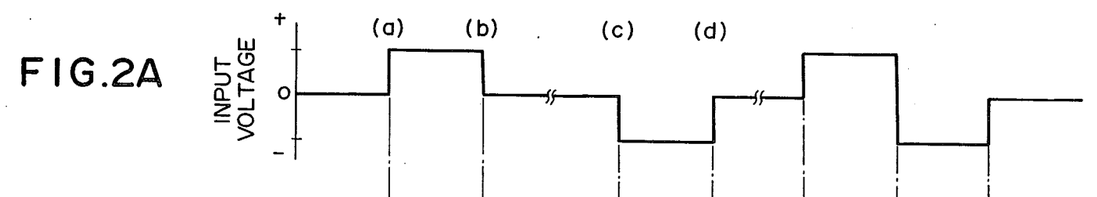
FIG. 2A is a diagram showing the input voltage applied to the EC display of this invention.
Figure 2B:
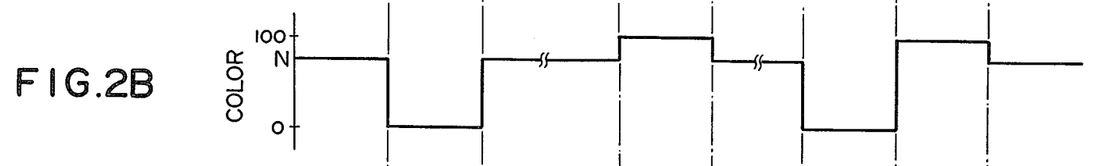
FIG. 2B is a diagram showing the change in color of the EC display of this invention excited with the input voltage as shown in FIG. 2A.
Figure 2C:
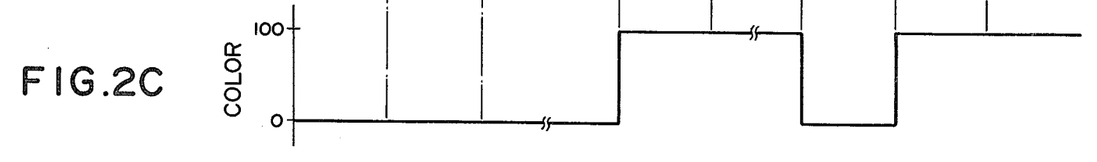
FIG. 2C is a diagram showing the change in color of the conventional EC display excited with the input voltage as shown in FIG. 2A.

The EC composition 16 is composed of an EC compound coloring in a reduced state, a solvent and a hiding agent of white pigment such as titanim oxide. Thus prepared EC display is used as a reflection type EC display which represents a pattern viewed on the surface of the electrode plate. The representation of the display pattern in color will be described hereinbelow with reference to FIGS. 2A to 2C. FIG. 2A shows the input voltage applied to the EC display. When the EC display of this invention is subjected to an electric field applied by the input voltage as shown in FIG. 2A, the color of the pattern displayed changes as shown in FIG. 2B. The color of the reduced EC composition when no electric field is applied is indicated at N on the color scale of 0 to 100. When an electric field is applied in one direction (plus potential is applied), the color displayed on the anode side electrode plate is changed from N to zero, which means the color disappears and the color of the white pigment appears, that is to say the color of the reduced EC compound N changes to white. Then, when the potential is removed at (b), the color is returned to its original color N. Further, when an electric field is applied in the opposite direction (minus potential is applied), the color displayed on the anode side electrode plate is changed from N to 100 as shown at (c). When the minus potential is removed at (d), the color is returned to its original color N. If the potential of minus and plus is alternately applied, the color is changed from 100 to 0 and 0 to 100. The color N is a mixed color of the reduced EC compound and the white pigment of titanium pigment. By changing the concentration of the reduced EC compound the color N can be changed between 100 and 0. FIG. 2C shows the change in color of a displayed pattern in a conventional EC display of memory type. The color displayed is zero when no potential is applied. When a plus potential is applied, the color does not change. When a minus potential is applied, the color is changed from 0 to 100 as shown at (c). Even when the minus potential is removed at (d), the color is not changed from 100. Only when the plus potential is applied, the color is changed from 100 to 0.

In the present invention, the EC composition is sealed in an EC display cell in a reduced state. In order to put the EC composition in a reduced state, the EC composition is treated in a reducing atmosphere as of hydrogen gas or the hydrogen gas passed through the EC composition. Alternatively, the EC composition is treated in an inactive atmosphere as of nitrogen gas and after the EC composition is sealed in a cell in the inactive atmosphere an electric field is applied to the cell to put the EC composition within the cell in a reduced state. Further, the EC composition may be put in a reduced state by putting a metal having a high reducing potential such as aluminium foil into the EC composition and sealing the EC composition in an EC display cell in an inactive atmosphere.

As the EC compound used in the present invention may be employed dialkyl diazopyrenium and dialkyl bipyridinium halide made by reaction of alkyl halide and $\alpha,\alpha'$-bipyridinium or $\gamma,\gamma'$-bipyridinium, for example. The EC compound should have a high solubility to the solvent as defined hereinbefore. Particularly, the EC composition is desired to have a high solubility to the solvent in a reduced state.

The solubility to the solvent depends upon the number of carbons of alkyl radicals contained in the compound in case of dialkyl bipyridinium halides. The relationship between the number of carbons and the solubility in case of $\gamma,\gamma'$-dialkyl bipyridinium bromide is as shown in the following Tables I, II and III. Table I shows the solubility when water is used as the solvent. Table II shows the same when the solvent is composed of 75% by weight of water and 25% by weight of ethylene glycol. Table III shows the same when the solvent is composed of 25% by weight of water and 75% by weight of ethylene glycol.

Table I

| Number of carbons | | C1 | C2 | C3 | C4 | C5 | C6 |
|---|---|---|---|---|---|---|---|
| Solubility | Oxidized | 2.5 | 1.9 | 1.5 | 1.2 | 1.1 | 0.8 |
| mol/100g | Reduced | 1.5 | $9 \times 10^{-2}$ | $2 \times 10^{-3}$ | $4 \times 10^{-5}$ | $1 \times 10^{-5}$ | $1 \times 10^{-6}$ |

Table II

| Number of carbons | | C1 | C2 | C3 | C4 | C5 | C6 |
|---|---|---|---|---|---|---|---|
| Solubility | Oxidized | 2.0 | 1.5 | 1.2 | 1.0 | 0.8 | 0.6 |
| mol/100g | Reduced | 1.1 | 0.9 | 0.2 | 0.1 | $1 \times 10^{-2}$ | $1 \times 10^{-3}$ |

Table III

| Number of carbons | | C1 | C2 | C3 | C4 | C5 | C6 |
|---|---|---|---|---|---|---|---|
| Solubility | Oxidized | 1.8 | 1.2 | 1.0 | 0.7 | 0.5 | 0.3 |
| mol/100g | Reduced | 1.3 | 1.1 | 0.5 | 0.4 | 0.3 | 0.1 |

In case of C1 (number of carbon is 1) of Table I, for instance, the time for completely erasing the display is about 250 msec. When C2, 500 msec and C3, 1 sec. When the number of carbons exceeds 3 as in C4, the time for erasing display is considerably elongated and accordingly a practical erasure cannot be effected. In other words, the solubility is desired to be not less than $10^{-2}$ mol/(100 g solvent) in a reduced state and not less than $10^{-1}$ mol/(100 g solvent) in an oxidized state.

$\gamma,\gamma'$-dialkyl bipyridinium represented by the formula or $\alpha,\alpha'$-dialkyl bipyridinium represented by the formula are preferred examples of the EC compound for the EC display of this invention. In the above formulae, R1 and R2 are methyl, ethyl or propyl, and X is F, Cl, Br or I. The alkyl radicals R1 and R1 are most preferred to be methyl as shown in the above tables.

As for the solvent contained in the EC composition, water can be used as in the conventional memory type EC display device. However, water is electrolyzed by the electrodes of the EC display device and hydrogen and oxygen are generated to deteriorate electrodes, which results in malfunction of the display. Further, from the viewpoint of the temperature range, water is disadvantageous since the range between the freezing point and the boiling point is narrow. Besides, the bipyridinium salt used as the EC compound has two step reduction reaction as follows and the bipyridinium salt in the second reduction state as shown at III in the following formula is hard to oxidize and solve in water. Therefore, the salt is liable to stick on the surface of the electrode and increase the surface resistance thereof, whereby the display is nullified.

In the above formula, R and R' are alkyl radicals.

In view of the defects of the EC display wherein water is used as the solvent for the EC compound, it is preferred to use alcohol together with water. The solvent should preferably be composed of at least 70% by weight of alcohol and water in which organic or inorganic salt such as KBr, NaCl or quaternary ammonium salt is solved.

The organic or inorganic salt is used as an aqueous solution of about 10% concentration by weight. The amount of the aqueous solution consisting of the salt and water should not be less than 0.1% by weight of total amount of the solvent consisting of water and alcohol, since otherwise the exchange of electrons is not effectively made and the operating voltage required for the display in a predetermined contrast is raised. On the other hand, if the amount of the water exceeds 30% by weight of the total amount of the solvent, the water is electrolyzied and the electrodes are damaged by the nascent oxygen or hydrogen. Further, as mentioned hereinbefore, the bipyridinium salt in the second reduction state lowers the quality of the image displayed. Thus, the alcohol is desired to be contained in the solvent in the amount not less than 70% by weight of the total amount of the solvent, and more preferably be contained in the solvent in the amount of 90 to 99% by weight of the total amount of the solvent.

As the alcohol which can be used in this invention is defined as a compound having a structure wherein the hydrogen atoms of aliphatic hydrocarbons, hydrogen atoms of cyclic compounds or hydrogen atoms of side chain are substituted by hydroxyl groups. As monohydric alcohol, are straight chain alcohols such as methyl alcohol, ethyl alcohol, ethyl alcohol, amyl alcohol and decyl alcohol, secondary alcohols such as isopropyl alcohol and isobutyl alcohol, tertiary alcohols such as tertiary butyl alcohol, and cyclic alcohols such as cyclohexanol, methyl cyclohexanol and benzyl alcohol. As dihydric alcohol, are $\omega,\omega'$-glycol such as ethylene glycol, propylene glycol, tetramethylene glycol, pentamethylene glycol, hexamethylene glycol, and diethylene glycol. As trihydric alcohol is glycerol. As tetrahydric alcohol is erythritol. As pentahydric alcohol is pentaerythtitol. As other alcohols are carbonhydrates such as saccharides, cellulose and starch, for example, monosaccharides like d-glucose, d-mannose and d-fructose, and disaccharides like maltose, lactose and sucrose. In case of cellulose, hydroxyl groups of a part thereof may be substituted by other groups.

The above alcohols may be used solely or as a mixture of more than one alcohol. When more than one alcohol is used, the solidifying point of the solvent is lowered and the boiling point is raised, which results in enlargement of the operable temperature range. Further, the dihydric or trihydric alcohol is more preferable than the other alcohols. Among the preferable alcohols, ethylene glycol is particularly preferred.

Figure 3A:
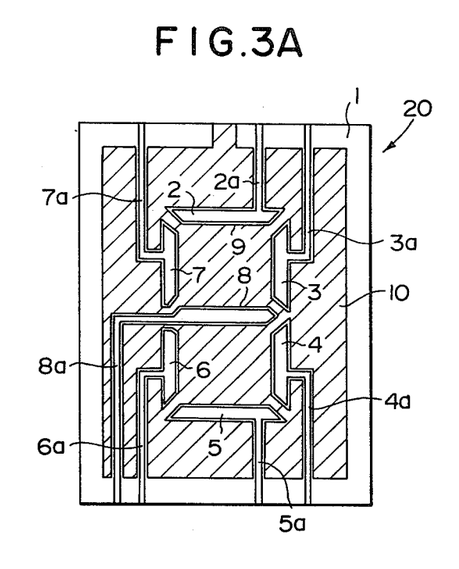
FIG. 3A is a plan view of a front electrode plate of a preferred embodiment of the EC display in accordance with the present invention.
Figure 3B:
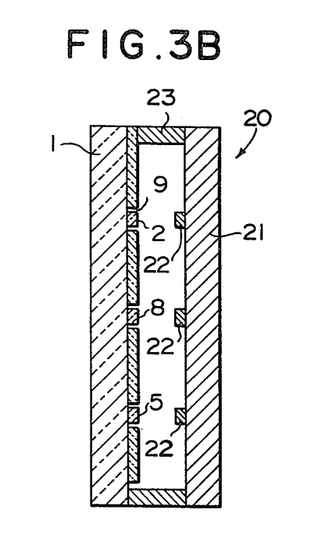
FIG. 3B is a cross sectional view of an empty EC display cell employing the front electrode plate as shown in FIG. 3A in accordance with a preferred embodiment of the present invention.

In the EC display, the electrodes are generally made of indium oxide or tin oxide. The indium oxide or tin oxide is used not only as the pattern shaped electrodes but also as the lead wires connecting the electrodes to input terminals of the display device. These materials increases its resistance as the transmittivity thereof is increased. In order to obtain a uniform density of display and to conduct display with a low input potential, the transmittivity of the electrodes and lead wires provided on the electrode plates cannot be made below a predetermined level. Therefore, the electrodes and lead wires are inevitably seen even when the input potential for display is not applied to the display device. In order to prevent this, it is desirable that a transparent film which is made of the same material as that of the electrode and the lead wires should be provided on the electrode plate. One example of the electrode plate provided with such a film is shown in FIGS. 3A and 3B. Referring to FIGS. 3A and 3B, an electrode plate 1 is provided thereon with seven-segment type display pattern elements 2 to 8 which form a character "8" and lead wires 2a to 8a connected therewith. Further, the electrode plate 1 is provided with a transparent film 10 which is made of the same material as that of the electrodes 2 to 8 and lead wires 2a to 8a and covers the area not covered with the electrodes and the lead wires. There are formed very narrow spaces between the electrodes connected with the lead wires and the transparent film 10. The narrow spaces are almost invisible to human eyes. As shown in FIG. 3B, on a back electrode plate 21 provided opposite to the front electrode plate 1 are deposited electrodes 22 at positions to face to the front electrodes 2 to 8. The front and back electrode plates 1 and 21 are connected to each other by means of a spacer 23 which encloses a space to be filled with an EC composition therebetween. When the EC display device thus prepared is viewed from front, the whole front area appears to be uniformly in the same color or density.

Figure 4:
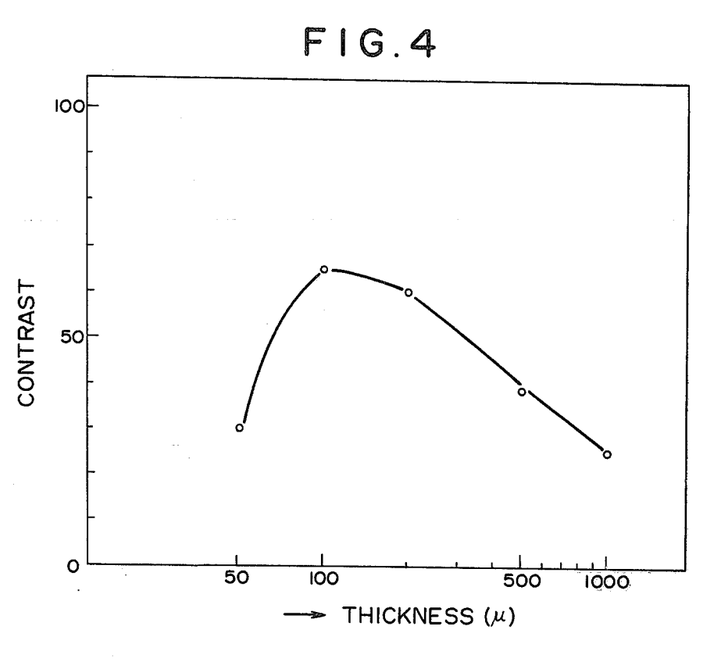
FIG. 4 is a front view of a front electrode plate of another preferred embodiment of the EC display in accordance with the present invention.

Further, in order to enhance the quality of image displayed, it is desired that the separate electrode elements as said elements 2 to 8 in FIG. 3A should be colored in the same density. Since the electrode elements are made of a material which effects a voltage drop by its resistance, the density of color displayed differs according to the distance of the elements from the input terminals. The longer is the distance, the lower is the density of color displayed thereby. Therefore, it is desired that the voltage drop effected in the respective elements be equal to each other. FIG. 4 shows one solution of this problem. As shown in FIG. 4, the electrode element 31 located at the longest distance from its input terminal at the lower edge of the electrode plate is connected with a lead wire 31a having the largest width, and the electrode element 34 located at the shortest distance from its input terminal is connected with a lead wire 34a of the smallest width. The remaining electrode elements 32, 33, 35, 36 and 37 are connected to lead wires of the width corresponding to the distance thereof from the input terminals. Thus, the voltage drop effected on the respective electrode elements 31 to 37 is made equal to each other.

In the EC display, a hiding agent such as titanium oxide, zinc sulfide, chrome yellow, zinc chromate, red iron oxide, red lead, prussian blue or ultramarine is mixed with the EC composition so that the color on the back electrode may not be seen from front when the EC composition on the front electrode becomes transparent or nearly transparent. Since the EC composition is reduced on one electrode and oxidized on the opposite electrode at the same time, the color of the reduced composition on the back electrode would be seen through the transparent oxidized composition from front. Therefore, in order to effect display in high contrast, the hiding agent should be contained in the EC composition. The amount of the hiding agent is generally 20 to 70% by weight of the total amount of the EC composition. More preferably, it should be 40 to 60% by weight. In terms of the hiding effect, the amount of the hiding agent should be such that the hiding effect or power is not less 30 $cm^2/g$, more preferably not less than 100 $cm^2/g$. The hiding effect, however, is lowered if the spacing between the electrode plates is small. Further, if the spacing between the electrode plates is too small, it becomes very difficult to put the EC compound into the space between the electrode plates. On the other hand, if the spacing between the electrode plates is too large, the hiding agent such as titanium oxide will precipitate and the contrast of the displayed image becomes uneven. On the other hand, the spacing between the electrode plates should preferably be small in view of the response speed of the EC display. From the view point of the response speed, the spacing is desired to be not more than 300μ so as to effect the response speed of not less than 500 ms. In order that the response speed should be not less than 300 ms, the spacing should be not more than 200μ.

In view of the above mentioned various requirements as to the spacing between the electrode plates, the spacing should preferably be 60 to 500μ in order that the manufacture of the EC display is easy, the hiding agent does not precipitate and the response speed is not lower than 500 ms.

Figure 5:
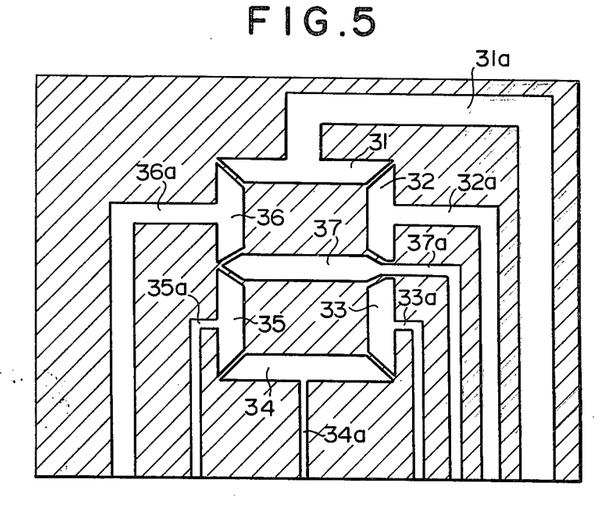
FIG. 5 is a graphic representation showing the relationship between the contrast of image obtained by the EC display of this invention and the thickness of the EC compound filled space between a pair of electrode plates of the EC display.

The relationship between the contrast of the displayed image and the thickness of the EC composition, i.e. the spacing between the electrode plates, is shown in FIG. 5. As shown in FIG. 5, when the thickness becomes less than 60μ, the color of the EC compound on the back electrode is seen from front and the contrast of the displayed image is lowered considerably. When the thickness exceeds 500μ, the contrast is lowered below 40. Generally, in order that the image should be observed with sufficient contrast, the contrast is desired to be at least 20 or 30. In practical use, the contrast of the image displayed by the EC display should preferably be not lower than 40. In order to result the contrast of 40 or more, the thickness of the EC composition is desired to be 60 to 500μ, more preferably 80 to 200μ.

Now the present invention will be described with reference to several examples thereof. Before the examples, an example of a prior art will be described as a comparative example.

COMPARATIVE EXAMPLE

An EC composition was prepared by mixing, for 2 hours with a ball mill in an atmosphere of nitrogen, 5% by weight of $\gamma,\gamma'$-dihepthyl bipyridinium bromide, 44% by weight of deoxygenated deoxygenated distilled water, 50% by weight of titanium oxide and 1% weight of polyethyleneglycol nonylphenol ether (surface active agent). Aluminum foils were then added to the composition to reduce the EC compound contained in the composition. The result was that a composition was obtained in which water-insoluble $\gamma,\gamma'$-dihepthyl bipyridinium bromide was dispersed.

A cell was filled with the composition thus obtained to prepare a display device, in the same manner as in Example 1 to be described later. The display device had a heterogeneous displaying surface due to the mixing of the blue-colored EC compound and the white-colored titanium oxide. When a 1.5-volt D.C. voltage was applied to the electrodes with the front electrode as anode, a white display pattern appeared. However, the display remained even after the voltage was removed. The display device was also found not to behave differently from a conventional display device of memory type when operated several times with A.C. voltage.

The present invention will be described in more detail with reference to the following examples.

EXAMPLE 1

An EC composition was prepared by mixing vigorously with a ball mill 5% by weight of $\gamma,\gamma'$-dimethyl bipyridinium bromide, 44% by weight of distilled water, 50% by weight of titanium oxide and 1% by weight of polyethyleneglycol phenol ether. Nitrogen was then blown into the composition for a period of 2 hours to remove oxygen therefrom.

As shown in FIG. 1, a cell for an electrochromic display device was formed by placing a pair of electrode plates 11 and 12, each formed by depositing $In_2O_3$ to a surface resistance $10\Omega/cm^2$ on a glass substrate, in opposing relation through a spacer 15 at a cell distance of 100μ. The cell thus formed was then filled with the EC composition prepared in the manner as described above while the cell was evacuated through a pore in a nitrogen atmosphere of 20 mmHg. The EC display device was finally formed by sealing the pores with polyethylene wax.

When a D.C. voltage of 1.9-volt was applied to this EC display device, the cathode side thereof was colored blue. When the voltage was removed, after 1 minute, the blue color was diffused to the anode side. The device was thus wholly colored blue indicating that the EC compound was in a reduced state. When a D.C. voltage of 0.9-volt was applied to the EC display device in this state, the anode side thereof developed into white color due to the presence of titanium oxide. Then, when the voltage was removed, the anode side recovered its original blue color 200 ms. The displaying function of the device was thus found to be turned ON and OFF by turning the D.C. voltage ON and OFF.

EXAMPLE 2

In a mixture 100 g of water (75% by weight) and ethylene glycol (25% by weight) was dissolved 5 g of $\gamma,\gamma'$-dimethyl bipyridinium bromide. The resulting solution was added with 25 g of titanium oxide and 0.1 g of polyethylene glycol nonylphenol ether to form an EC composition. An EC display device of diffusion type was prepared with this EC composition in a manner as in Example 1. This display device was found to lose its color display in 200 ms.

EXAMPLE 3

The EC composition prepared in the same way as in Example 1 was reduced with aluminum foils in an atmosphere of nitrogen to form a blue-colored EC composition. With this EC composition was made an EC device, whose anode displayed a white color when a D.C. voltage of 1.0-volt was applied. The display pattern was erased in 300 ms by the removal of the voltage.

EXAMPLE 4

An EC display device was constructed as in Example using $\gamma,\gamma'$-dimethyl bipyridinium chrode as an EC compound. On applying a 0.9-volt D.C. voltage to this device, a white display appeared due to the presence of titanium oxide. The display turned off in 250 ms when the voltage was turned off.

EXAMPLE 5

An EC display device was constructed by filling a cell with $\gamma,\gamma'$-diethyl bipyridinium chloride as an EC compound, in the same manner as in Example 1. At a 1.0-volt D.C. voltage applied, the device displayed white due to the presence of titanium oxide. The display was lost in 500 ms when the voltage was shut off.

EXAMPLE 6

As in Example 1, a cell was filled with an EC composition containing $\gamma,\gamma'$-methyl-ethyl-bipyridinium chloride (as EC compound) to form an EC display device. At a D.C. voltage of 1.5-volt applied, the device displayed white color due to the presence of titanium oxide. The display was erased in 350 ms when the power was shut off.

EXAMPLE 7

An EC display device was made by filling a cell with α,α'-methyl-ethyl-bipyridinium bromide as an EC compound, in the same manner as described in Example 1. The white color display, which had appeared at a 1.1-volt D.C. voltage, was lost in 380 ms by the removal of the voltage.

EXAMPLE 8

The procedure as in Example 1 was repeated, except that N,N'-dimethyl-2,7-diazopyrenium difluoroborate was employed as an EC compound, to manufacture an EC display device. When 1.5-volt D.C. voltage was applied, the device displayed a mixed color due to the presence of white-colored titanium oxide and the light orange-colored EC composition. The display was erased in 300 ms when the voltage was turned off.

EXAMPLE 9

A pair of transparent front- and back-electrodes were each prepared by depositing indium oxide to a surface resistance $10\Omega/cm^2$ on a glass plate and then etching the deposited oxide to form a seven-segmented display pattern as letter "8". The glass plate supporting the back electrode was bored with three holes with a supersonic boring tool, and subjected to a supersonic washing with freon as solvent. The glass plate was then coated, on its back-electrode side, with low-melting glass frit by silk-screen printing in a thickness of $100\mu$ for providing a sealed space between the electrodes. The glass plate thus treated was then put, after being dried, upon the glass plate supporting the front electrode so that the two electrodes were placed in opposing relation. The assembled body was heated up to 510° C. in 60 minutes and then maintained at that temperature for 10 minutes to form an empty cell. Ten identical cells were made in this manner.

In the meantime, nine EC compositions having different solvent compositions were prepared and each of them was injected in one of the cells under pressure through the holes (as previously explained) in an atmosphere of nitrogen. After the pores for each cell were blocked up with In-Sn solder, a D.C. voltage of 2-volt was applied to each of the cells for a period of 30 minutes with reversing the electrode polarity every one second resulting in that each of the cells was wholly colored blue even after the removal of the voltage. Thus nine EC display devices of diffusion type, designated as No. 1 through No. 9, were prepared.

The EC compositions were all composed of 5% by weight of dimethyl bipyridinium bromide, 49.9% by weight of titanium oxide and 0.1% by weight of potassium bromide. The compositions of the solvents, which are all present in amounts of 45% by weight on the basis of the total EC compositions, are summarized in Table 6 below.

On applying a D.C. voltage of 1.0-volt to each of the devices so that the displaying surface should be positive in each device, the letter "8" was displayed in white color, due to the presence of titanium oxide, with blue color for a background. When the voltage was removed, the display disappeared so that the device turned wholly its original blue color.

Table 6

| No. | Solvent Composition | | |
|---|---|---|---|
| 1 | ethylene glycol | 40% | (89%) |
| 2 | water | 5% | (11%) |
|   | glycerine | 38% | (84%) |
|   | water | 7% | (16%) |
| 3 | ethylene glycol | 40% | (89%) |
|   | cellulose | 3% | (7%) |
|   | water | 2% | (4%) |
| 4 | ethylene glycol | 20% | (44.5%) |
|   | glycerine | 20% | (44.5%) |
|   | water | 5% | (11%) |
| 5 | ethylene glycol | 35% | (78%) |
|   | water | 10% | (22%) |
| 6 | ethylene glycol | 35% | (78%) |
|   | starch | 5% | (11%) |
|   | water | 5% | (11%) |
| 7 | ethylene glycol | 35% | (78%) |
|   | maltose | 5% | (11%) |
|   | water | 5% | (11%) |
| 8 | texanol monobutylate | 40% | (89%) |
|   | water | 5% | (11%) |
| 9 | water | 45% | (100%) |

* Each of the values after the name of each compound shows percentage by weight of the compound on the basis of the total weight of each EC composition while each of the values in parenthesis indicates percentage by weight of the same compound on the total weight of each solvent. It is further noted that the solvents were all subjected to deoxygenating treatments.

The number of a signal response was determined for each display device by turning a D.C. voltage of 2.0-volt on-off every 2 seconds. As a result, the devices according to the present invention (No. 1 through No. 8) could respond more than $5\times10^8$ times while the device No. 9 failed to respond after $1.6\times10^3$ times with the formation of a lot of bubbles on the displaying surface. When the similar tests were carried out at −20° C., it was found that the devices No. 1 through No. 8 could respond more than $1.5\times10^3$ times while the device No. 9 failed to display the signal even from the beginning.

The display disappearing rates of the devices were given in Table 7.

Table 7

| No. | Disappearing Speed (m sec.) |
|---|---|
| 1 | 150 |
| 2 | 200 |
| 3 | 500 |
| 4 | 170 |
| 5 | 100 |
| 6 | 350 |
| 7 | 300 |
| 8 | 300 |

EXAMPLE 10

An EC display device of diffusion was constructed in the same manner as in Example 1 except that the EC composition was replaced by the one prepared by dissolving 5% by weight of 4,4'-dihepthyl bipyridinium bromide, 49.9% by weight of titanium oxide and 0.1% by weight of potassim bromide in a solvent of 40% by weight of ethylene glycol and 5% by weight of water. The device was found to lose its display effect in 300 ms. The tests as in Example 1 were repeated with this device with almost the same results in Example 1.

We claim:

1. An electrochromic display device comprising a pair of oppositely disposed electrode plates each bearing on the inner surface thereof an electrode and an electrochromic composition sealed between said pair of oppositely disposed electrode plates, said electrochromic composition consisting essentially of an electrochromic compound which is colored in and present in its reduced state and a solvent selected from the group consisting of (a) water and (b) water and alcohol, the solubility of said electrochromic compound to said solvent being not less than $10^{-2}$ mol/(100 g solvent) in said reduced state and not less than $10^{-1}$ mol/(100 g solvent) in an oxidized state, said electrochromic composition being sealed between said pair of electrode plates in said reduced state.

2. An electrochromic display device as defined in claim 1 wherein said electrochromic composition consists essentially of said electrochromic compound, said solvent, and a hiding agent.

3. An electrochromic display device as defined in claim 2 wherein said electrochromic compound is a dialkyl bipyridinium salt.

4. An electrochromic display device as defined in claim 3 wherein said dialkyl bipyridinium salt is $\gamma,\gamma'$-dialkyl bipyridinium halide represented by the formula;

wherein R1 and R2 are alkyl radicals selected from the group consisting of methyl, ethyl and propyl, and $X^-$ is a halogen ion selected from the group consisting of $F^-$, $Cl^-$, $Br^-$ and $I^-$.

5. An electrochromic display device as defined in claim 3 wherein said dialkyl bipyridinium salt is $\alpha,\alpha'$-dialkyl bipyridinium halide represented by the formula;

wherein R1 abd R2 are methyl, ethyl or propyl, and $X^-$ is an halogen ion selected from the group consisting of $F^-$, $Cl^-$, $Br^-$ and $I^-$.

6. An electrochromic display device as defined in claim 2 wherein said electrochromic compound is N,N'-dimethyl-2,7-diazopyrenium difluoroborate.

7. An electrochromic display device as defined in claim 1 wherein said solvent comprises 70% or more by weight of the alcohol.

8. An electrochromic display device as defined in claim 7 wherein said alcohol is polyhydric alcohol.

9. An electrochromic display device as defined in claim 8 wherein said polyhydric alcohol is ethylene glycol.

10. An electrochromic display device as defined in claim 1 wherein said electrode plates are provided on the inner surface thereof with at least one pattern shaped electrode made of a transparent material and a cover film which covers the inner surface of the electrode plates where said pattern shaped electrode is not provided, said cover film being transparent, the transmittivity of said electrode being substantially equal to that of said cover film.

11. An electrochromic display device as defined in claim 10 wherein said electrode and said cover film are made of the same material.

12. An electrochromic display device as defined in claim 1 wherein said electrode is composed of a plurality of separated electrode elements which are connected to the respective input terminals by way of lead wires of different length, the width of longer lead wires being larger than that of shorter lead wires so that the voltage drop effected by the longer lead wires is equal to that by the shorter lead wires.

13. An electrochromic display device as defined in claim 1 wherein the spacing between said pair of oppositely disposed electrode plates is 60 to 500μ.

14. An electrochromic display device as defined in claim 13 wherein the said spacing is 80 to 200μ.

15. An electrochromic display device as in claim 1 where said electrochromic composition consists of said electrochromic compound and said solvent.

16. An electrochromic display element as in claim 15 where the alcohol is not less than 70% by weight of the total amount of the solvent.

17. An electrochromic display element as in claim 16 where said electrochromic compound is selected from the group consisting of dialkyl diazopyrenium and dialkyl bipyridinium salt.

18. An electrochromic display device as in claim 16 including means for energizing the device by applying an electric potential across said plates and by extinguishing it by only removing said potential therefrom.

19. An electrochromic display device as in claim 2 where said electrochromic composition consists of said electrochromic compound, said solvent and said hiding agent.

20. An electrochromic display element as in claim 8 where said electrochromic compound is selected from the group consisting of dialkyl diazopyrenium and dialkyl bipyridinium salt.

21. An electrochromic display device as in claim 1 including means for energizing the device by applying an electric potential across said plates and by extinguishing it by only removing said potential therefrom.

22. A method of operating an electrochromic display device comprising a pair of oppositely disposed electrode plates each bearing on the inner surface thereof an electrode and an electrochromic composition sealed between said pair of oppositely disposed electrode plates, said electrochromic composition being composed of an electrochromic compound which is colored in a reduced state and a solvent selected from the group consisting of (a) water and (b) water and alcohol where the alcohol is not less than 70% by weight of the total amount of the solvent, the solubility of said electrochromic compound to said solvent being not less than $10^{-2}$ mol/(100 g solvent) in said reduced state and not less than $10^{-1}$ mol/(100 g solvent) in an oxidized state, said electrochromic composition being sealed between said pair of electrode plates in said reduced state, said method comprising the steps of
energizing said device by applying an electrical potential across said plates and
extinguishing said device by only removing said potential therefrom.

23. An electrochromic display device as in claim 22 where said electrochromic composition consists of said electrochromic compound and said solvent.

24. An electrochromic display element as in claim 23 where said electrochromic compound is selected from the group consisting of dialkyl diazopyrenium and dialkyl bipyridinium salt.

* * * * *